US006045768A

United States Patent [19]

Bergmann

[11] Patent Number: 6,045,768

[45] **Date of Patent: *Apr. 4, 2000**

[54] REMOVAL OF CARBON FROM PARTICULATE MIXTURES

[75] Inventor: Oswald Robert Bergmann, Wilmington, Del.

[73] Assignee: Mypodiamond Inc., Gibbstown, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/904,469

[22] Filed: Aug. 1, 1997

[51] Int. Cl.$^{7}$ .......... B01J 3/06

[52] U.S. Cl. .......... 423/446; 423/460; 423/461

[58] Field of Search .......... 423/446, 460, 423/461; 264/37

[56] References Cited

U.S. PATENT DOCUMENTS

| | | | |
|---|---|---|---|
| 3,348,918 | 10/1967 | Kruse | 23/209.9 |
| 4,054,687 | 10/1977 | Kunz | 502/185 |
| 5,271,917 | 12/1993 | Hoffman | 423/447.6 |

FOREIGN PATENT DOCUMENTS

| | | | |
|---|---|---|---|
| 224 575 A1 | 7/1985 | Germany . | |
| 224575 | 7/1985 | Germany | 423/446 |
| 2004491-C1 | 7/1991 | Russian Federation . | |
| 2036138-C1 | 2/1993 | Russian Federation . | |

*Primary Examiner*—Steven P. Griffin
*Assistant Examiner*—Stuart L. Hendrickson
*Attorney, Agent, or Firm*—Pepper Hamilton LLP

[57] ABSTRACT

A process for selective removal of residual carbon, such as graphite, from a mixture also containing a valuable material, such as diamonds, by selective oxidation using a silver oxide doped on copper oxide catalyst.

17 Claims, No Drawings

REMOVAL OF CARBON FROM PARTICULATE MIXTURES

BACKGROUND OF THE INVENTION

1. Technical Field

This invention relates to removal of carbon from particulate mixtures by catalyzed oxidation. All elemental forms of carbon, other than diamonds, can be removed from the particulate mixture using the process. The process is especially useful for removal of residual carbon in the manufacture of synthetic diamonds.

2. Description of Related Art

Carbon can be removed from some particulate mixtures by conventional physical procedures such as settling, filtration, use of centrifuges, and distillation. Physical separation techniques cannot be used, however, if the carbon particles are too small, because of tight bonding between the carbon particles and other particulates in the mixture. Chemical procedures, such as air oxidation, must be used in these situations.

If the other mixture components are highly resistant to oxidation (such as many inorganic oxides, silicates, and clays), carbon can be removed by heating the mixture above 600° C. in an oxidizing atmosphere, without significant loss or modification of other mixture components. Fixed-bed, fluidized bed, and rotary kilns may be used for this purpose. Catalysts may be used to reduce the temperature needed to oxidize the carbon if the mixture contains valuable components, which are to be recovered, that are unstable at higher temperatures.

U.S. Pat. No. 3,348,918 describes a process for removing carbon from carbon/diamond mixtures by selective oxidation with molecular oxygen in the presence of a lead oxide catalyst at a temperature within the range of about from 250 to 500° C. The catalyst is uniformly distributed throughout the carbon/diamond mixture. For example, an oxide or an oxygen containing compound of lead which is transformed in situ to an oxide of lead at the reaction temperature or below, e.g., lead carbonate, hydroxide, nitrate, subacetate, etc., is homogeneously mixed with the powder mixture either by hand or mechanically.

E. Ger. Pat. No. DD 224,575 A1 describes a process for removing carbon from carbon-diamond mixtures wherein an aqueous solution of copper salts, which decompose at temperatures higher than 450° C. with the formation of CuO or $Cu_2O$, is mixed with the carbon-diamond mixture. The suspension is dried and reacted at a maximum temperature of 540° C. with addition of oxygen containing gases. The reaction product is boiled with hydrochloric or nitric acid, the acid is washed out with water and the product dried. X-ray analysis indicates that the residue is an almost graphite-free diamonds.

Unreacted carbon must be removed in the manufacture of diamonds by explosive shock synthesis. The current industrial practice is to mix a catalytic amount of lead oxide powder with the carbon/diamond material produced by explosive shock synthesis, and to heat the mixture in air at about 400° C. for several hours. The non-diamond carbon thereby is oxidized, forming gaseous CO and $CO_2$ that is vented from the process, leaving a mixture of diamonds and lead oxide catalyst. Acid leaching removes the lead oxide catalyst; diamonds are recovered.

Industry is seeking to replace lead compounds in commercial processes for environmental and health reasons. Moreover, lead oxide may reduce the diamond yield in the process described above due to diamond "burn-up", which especially causes loss of valuable sub-micron particles.

Thus, there is a need for an improved process to remove carbon from valuable particulate material, such as diamond/carbon mixtures.

SUMMARY OF THE INVENTION

It now has been found that silver oxide, alone or as a dopant for copper oxide, is an effective catalyst for the oxidation of elemental particulate carbon in the temperature range of 300° to 500° C. The carbon may be any of the elemental carbons other than diamonds.

Accordingly, the present invention provides a process for the removal of solid carbon from a particulate material comprising:

(a) forming an intimate mixture of said particulate material and an effective amount of a catalyst selected from the group consisting of silver oxide and copper oxide doped with silver oxide, and (b) heating the intimate mixture of step (a) in the presence of oxygen to a temperature in the range of 250° to 500° C. for 12 to 60 hours to oxidize the solid carbon.

Catalyst is conveniently removed from the particulate material, after step (b), by acid leaching. In a preferred embodiment, the process is used to treat the mixture of diamonds and unreacted carbon produced in the production of synthetic diamonds, thereby removing excess unreacted carbon and enabling the recovery of highly pure diamonds.

DETAILED DESCRIPTION OF THE INVENTION

The process of this invention may be used to remove particulate carbon from a variety of materials. The process has special utility in removing particulate carbon from mixtures of diamonds and carbon formed during the commercial manufacture of diamonds. Accordingly, the invention will be described in detail as applied to this preferred embodiment.

Particulate Carbon

As used herein, the term "particulate carbon" refers to elemental forms of solid carbon such as, but not limited to, graphite, carbon black, amorphous carbon, charcoal, and cokes. The term does not include diamonds, which have different physical and chemical properties than the elemental forms listed above. The particulate material, containing the carbon, typically has an average particle size ranging from sub-micron to 1 millimeter in diameter in order to minimize the amount of time needed to remove the carbon by the process.

Catalyst

The catalyst is silver oxide alone, or as a dopant with copper oxide. As used herein the terms "silver oxide" and "copper oxide" include precursor compounds that form silver oxide and copper oxide, respectively, in situ during the process.

The silver oxide may be introduced as silver, which oxidizes during the process, as silver salts of organic or inorganic anions that are volatile or decompose during the process to form the corresponding oxides, or silver oxide itself. Examples of suitable silver salts include silver nitrate, carbonate, formate, acetate, propionate, lactate, oxalate, hydroxide, and mixtures thereof. Silver acetate and nitrate are preferred because of their ready availability and the ease with which they can be uniformly distributed throughout the particulate material containing the carbon that is to be removed.

Copper oxide alone is not very effective for the purposes of the invention. Small amounts of silver oxide, or its precursors described above, however, greatly increase the activity of copper oxide. Thus, silver oxide serves as a dopant for the copper oxide, rendering it effective for the process. The copper oxide is conveniently added as copper acetate or copper nitrate, to facilitate formation of an intimate mixture with the silver oxide, or its precursor, and the particulate material containing elemental carbon. Copper oxide with a silver oxide dopant offers economic advantage over use of silver oxide alone.

Mixture

The particulate material containing elemental carbon, and catalyst, are uniformly mixed to form an intimate mixture. When the components are powder this can be accomplished by first mixing the powder using a spatula or preferably passing the powder through a sample splitter several times, usually at least 10 times. The pre-mixed powder is then dry milled in a ceramic ball mill using an inert grinding material, such as zirconia pellets, and after milling the powder mixture is recovered using a wire mesh screen. An alternative method is to dissolve water soluble precursor salts in water and use the solution to make a slurry or suspension with the carbon containing mixture. The water is evaporated by heating in air and the residue, comprising an intimate mixture of the carbon components and precursor salts, is readily converted to powder form.

The amount of catalyst selected will vary with the amount and type of carbon contained in the particulate material, the selected process temperature and time, and the amounts of oxygen present during the process. In general, the amount of catalyst added will increase with decreasing reaction time and/or temperature, and with increasing carbon content of the particulate mixture. For optimum efficiency, the mixture typically will contain between 2% and 40% catalyst, by weight, preferably between 10% and 20%. Optimum quantities are readily determined for a specific combination of catalyst and particulate material by routine experimentation. The oxidized carbon is readily vented from the process as CO and $CO_2$.

PREFERRED EMBODIMENT—SYNTHETIC DIAMOND MANUFACTURE

The process is particularly adapted for the recovery of diamonds from particulate material containing the diamonds and unconverted carbon. Such a material is produced in the synthesis of diamond by explosive shock treatment of carbon as described in U.S. Pat. No. 3,667,911 and U.S. Pat. No. 3,608,014. The basic steps involved are: mixing graphite with copper metal powder, packing the mixture into a steel tube (product tube) and closing both ends of the tube by welding steel end plugs in place. The product tube is placed concentrically inside a larger diameter heavy-walled steel tube (driver tube) in such a way that a substantial concentric space (gap) exists between the inside wall of the driver tube and the product tube. The driver tube/product tube assembly is welded together in this concentric configuration and is then placed centrally inside a large cylindrical container. Explosive is poured into the annular space and is detonated from the top of the explosive column to produce a circular detonation front that propagates axially along the length of the tube assembly. The detonation pressure produces a high-pressure shock condition in the graphite/metal mixture which converts the graphite into diamond. After the "shot" the assembly is recovered and the raw diamond/graphite mixture is removed by mechanical means and acid leaching of the metal.

The raw diamond/graphite particulate material is intimately mixed with silver oxide, or silver oxide and copper oxide, catalyst. These catalysts have been found to selectively oxidize the residual graphite, without unduly oxidizing the diamonds, under relatively mild oxidizing conditions below 500° C. Preferred are silver acetate or silver alone, or more preferably as dopants for copper acetate or copper nitrate. Catalyst combinations having a range of 2 to 5% silver salt and 15 to 18% copper salt by weight, based on total weight of the mixture, have been found to be particularly effective in selectively oxidizing the graphite under mild conditions.

The intimate mixture of catalyst and diamond/graphite particulate material then is placed in a thin layer, typically less than 13 mm in depth, in a suitable reactor. The mixture is heated in the presence of oxygen, preferably air. Air may be enriched with oxygen to expedite the process. Oxygen alone, or mixtures of oxygen with nitrogen or an inert gas (e.g., argon) also may be selected.

Silver and copper salts are converted in situ to the corresponding oxides, which selectively catalyze the oxidation of the carbon component of the mixture in the presence of oxygen gas. The higher the oxygen concentration, the lower the temperature and shorter the time required to completely oxides the carbon. Unduly high oxygen levels are avoided, however, since they diminish selectivity of the process and may cause loss of diamond yield at higher temperatures.

The particulate material is heated between 250° C. and 500° C., preferably between 350° C. and 430° C. Heating in the oxidizing atmosphere is continued for 12 to 60 hours, preferably 18 to 50 hours. Temperatures in the lower portion of the range are preferred, since catalytic oxidation may be less selective at the higher temperatures. When using air as the source of oxygen, the selected temperature generally will be at least 350° C., preferably at least 380° C. to 400° C., to achieve a desirable reaction rate. If pure oxygen is selected, however, the temperature may be as low as about 250° C.

After the oxidation step, the particulate material is cooled. An aqueous acid is added, and the resulting slurry is agitated for several hours at 60° to 80° C. to dissolve residual catalyst metal oxides. Aqueous solution of nitric, acetic, proprionic and oxalic acids may be selected to advantage. Metal salts subsequently may be recovered from the aqueous acid, for re-use. The undissolved component is separated by filtration or centrifuge, washed to remove impurities, and dried by conventional procedures. The synthetic diamonds so recovered contain less than 0.5%, and typically less than 0.2%, residual unreacted graphite by weight.

EXAMPLES

The following examples illustrate, but do not limit, the process of this invention.

Example 1

The following amounts of powders were weighed into a porcelain dish and hand mixed with a spatula; 14.00 grams of dried graphite-diamond mixture (product of a shock synthesis from graphite) and 3.5 grams silver acetate. The mixture was placed in a clean dry ceramic ball mill (500 ml. volume) containing zirconia pellets (approx. 5 mm diameter) and ball milled for 90 minutes at about 100 rpm. The milled powder was separated from the zirconia pellets (using a wire-mesh screen) and placed in a plastic bottle.

A sample of the milled powder was placed into a small rectangular tray and leveled off to a powder layer of approximately 3 mm depth. The weight of powder placed into the tray was 2.4998 grams. The tray was then positioned in the center of the hot zone of a mullite tube and heated in a Lindberg Tube Furnace to 400° C. with a medium fast (200 to 500 cc/min) stream of air flowing over the sample. After 24 hours at 400° C. the furnace was shut off and the sample cooled to room temperature while maintaining the air flow. The powder remaining in the tray weighed 1.2158 grams, the weight loss being 1.2840 grams or 51.36% of the original amount of powder.

1.0415 g of the oxidized powder was transferred to a glass beaker and 5 ml of deionized water was added. While stirring with a magnetic bar stirrer 120 ml of 35% nitric acid was added, and the slurry was heated and maintained at 70±5° C. for 3 hours with continued stirring, followed by cooling to below 40° C. The slurry was quantitatively filtered using a glass frit filter. The powder on the glass frit was washed three times with 50 ml 35% nitric acid and five times with 50 ml deionized water until the filtrate was clear, making sure no powder passed through the glass frit. The powder was vacuum dried on the upright glass frit at 120° C. for two hours and cooled to room temperature. The weight of dry powder recovered was 0.7651 g, (73.46% residue recovered).

A sample of the powder was analyzed by X-ray diffraction and found to contain 0.8% graphite; the balance being diamond. The amount of residual graphite was decreased to less than 0.1% when the air oxidation step at 400° C. was extended to about 50 to 60 hours.

Example 2

320 grams of dried diamond/graphite mixture, as used in Example 1, 68 grams of copper acetate and 12 grams of silver acetate were mixed together by the procedure described in Example 1.

77.74 grams of powder was oxidized by the procedure of Example 1 using a larger furnace, the powder layer depth being approximately 3 mm, and a longer heating time of 60 hours. This resulted in 28.83 grams of residual powder, the weight loss being 48.91 grams or 62.91% of the original powder.

14.9277 grams of oxidized powder was transferred to a 600 ml glass beaker and 10 ml of deionized water was added. While stirring with a magnetic bar stirrer 250 ml of 35% nitric acid was added and the slurry was heated at 70±5° C. for 3 hours with continued stirring, followed by cooling to below 40° C. The slurry was quantitatively filtered as in Example 1. The powder on the glass frit was washed three times with 100 ml 35% nitric acid and five times with 100 ml deionized water until the filtrate was clear, making sure that no powder passed through the glass frit. The powder was vacuum dried as described in Example 1. The weight of dry powder recovered was 11.3950 grams, (76.34% residue recovered).

A sample of the powder was analyzed by X-ray diffraction and no graphite was detected. Consequently less than 0.1% of graphite was present; the balance being diamond.

What is claimed is:

1. A process for the removal of solid carbon from a particulate material comprising:

(a) forming an intimate mixture of said particulate material and an effective amount of a catalyst comprising copper oxide doped with silver oxide, and (b) heating the intimate mixture of step (a) in the presence of oxygen to a temperature in the range of 250° to 500° C. for 12 to 60 hours to oxidize the solid carbon.

2. The process of claim 1 wherein said solid carbon is graphite, carbon black, amorphous carbon, charcoal or coke having an average particle or aggregate size up to 1 millimeter in diameter.

3. The process of claim 2 wherein said catalyst comprises 2 to 40% of said intimate mixture of step (a), by weight.

4. The process of claim 3 wherein said catalyst is formed from a mixture of salts.

5. The process of claim 4 wherein each of said salts is a nitrate, carbonate, formate, acetate, propionate, lactate, oxalate, or hydroxide.

6. The process of claim 4 wherein said mixture of salts comprises silver acetate and copper acetate.

7. A process as in any one of the preceding claims including the step, after step (b), of removing metal oxides by acid leaching.

8. A process for the selective removal of solid carbon from a particulate material containing synthetic diamonds comprising:

(a) forming an intimate mixture of said particulate material and an effective amount of a catalyst comprising copper oxide doped with silver oxide, and (b) heating the intimate mixture of step (a) in the presence of oxygen to a temperature in the range of 250° to 500° C. for 12 to 60 hours to oxidize the solid carbon.

9. The process of claim 8 including the step, after step (b), of (c) removing metal oxides by acid leaching.

10. The process of claim 9 wherein diamonds are recovered from step (c) containing less than 0.5% unreacted carbon.

11. The process of claim 9 wherein said solid carbon contained in said particulate material is graphite, carbon black, amorphous carbon, charcoal or coke having an average particle or aggregate size up to 1 millimeter in diameter.

12. The process of claim 11 wherein said catalyst comprises 2 to 40% of said intimate mixture of step (a), by weight.

13. The process of claim 12 wherein said catalyst is formed from a mixture of salts.

14. The process of claim 13 wherein each of said salts is a nitrate, carbonate, formate, acetate, propionate, lactate, oxalate, or hydroxide.

15. The process of claim 13 wherein said mixture of salts comprises silver acetate and copper acetate.

16. The process of claim 15 wherein the heating of step (b) is between 350° and 430° for 18 to 50 hours.

17. The process of claim 16 wherein, after the acid leching of step (c), the particulate material is wsahed to recover diamonds containing less that 0.5% residual unreacted carbon, by weight.

* * * * *